United States Patent [19]

Bazlen et al.

[11] 4,231,085
[45] Oct. 28, 1980

[54] ARRANGEMENT FOR MICRO INSTRUCTION CONTROL

[75] Inventors: Dieter Bazlen, Stuttgart; Rolf Berger, Schoenaich; Arnold Blum, Gechingen; Dietrich W. Bock; Herbert Chilinski, both of Schoenaich; Hellmuth R. Geng, Herrenberg; Johann Hajdu; Fritz Irro, both of Boeblingen; Siegfried Neuber, Sindelfingen, Udo Wille, Holzgerlingen, all of Fed. Republic of Germany

[73] Assignee: International Business Machines Corporation, Armonk, N.Y.

[21] Appl. No.: 934,781

[22] Filed: Aug. 18, 1978

[30] Foreign Application Priority Data

Oct. 21, 1977 [DE] Fed. Rep. of Germany ....... 2747304

[51] Int. Cl.² ............................................. G06F 9/12
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,343,141 | 9/1967 | Hackl | 364/200 |
| 3,380,025 | 4/1968 | Ragland | 364/200 |
| 3,748,649 | 7/1973 | McEowen et al. | 364/200 |
| 3,760,369 | 9/1973 | Kemp | 364/200 |
| 3,774,166 | 11/1973 | Vigliante | 364/200 |
| 3,800,293 | 3/1974 | Enger et al. | 364/200 |
| 3,821,715 | 6/1974 | Hoff, Jr. et al. | 364/200 |
| 3,889,242 | 6/1975 | Malmer, Jr. | 364/200 |
| 3,958,227 | 5/1976 | Evans | 364/200 |
| 4,034,345 | 7/1977 | Deis | 364/200 |
| 4,156,279 | 5/1979 | Wilhite | 364/200 |
| 4,173,041 | 10/1979 | Dvorak et al. | 364/200 |

OTHER PUBLICATIONS

IBM System/370 Principles of Operation, GA 22-7000-5, File No. S/370-01, Aug. 1976 Edition, pp. 103 and 104.
IBM Sys/370 Principles of Operation, p. 212.
"Specify Microcode Emit by Destination Field," Grice et al., IBM Tech. Disclosure Bull., vol. 20, No. 7, Dec. 1977, pp. 2556-2567.

Primary Examiner—Gareth D. Shaw
Assistant Examiner—E. Chan
Attorney, Agent, or Firm—Robert Lieber

[57] ABSTRACT

In a micro-controlled data handling system the number of lines and pins required to transfer control signals from the microprogram controls to be integrated circuit modules controlled by such signals is conserved by using two bussing paths for distributing the control signals to the modules. A first path is dedicated exclusively to pre-decoded control signal functions and a second path is shared for transferring both data and control signal functions. Each controlled module contains an additional decoding circuit for combinationally decoding control signal functions received through both paths.

5 Claims, 7 Drawing Figures

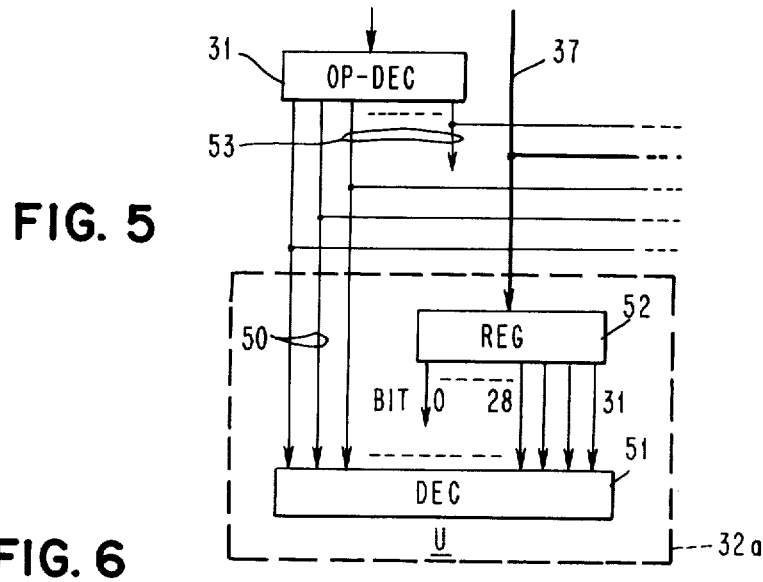
FIG. 5
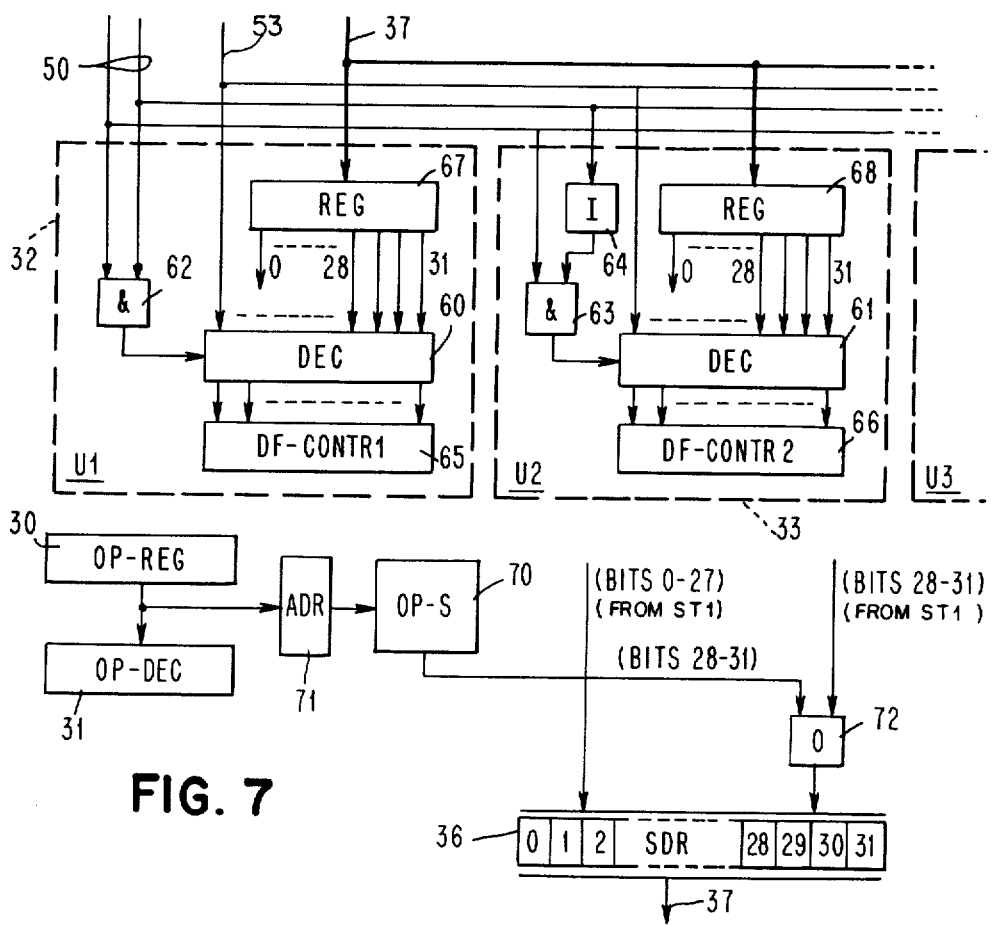
FIG. 6
FIG. 7

ARRANGEMENT FOR MICRO INSTRUCTION CONTROL

BACKGROUND OF THE INVENTION

This invention concerns an arrangement in a modularly structured data processing system for transferring micro instruction control signal functions from a control store module to plural integrated circuit modules in which data signals are processed under control of said control signal functions.

Prior art electronic digital computers exemplified in FIG. 1 generally consist of a storage (ST) 1, an arithmetic and logical unit (ALU) 2, a microprogrammed control unit (CONTR) 3, peripheral input/output units (I/O) 4, and a bus system 5 connecting said units.

Modern microprogram control units are generally designed to interpretively execute machine language instructions by executing a sequence of micro instructions for each instruction. The totality of the micro instructions, or the microprogram, is generally stored in a microprogram storage ($\mu$-ST) 20 as shown in FIG. 2. This storage 20 is addressed via an address register 21. In one known method of addressing the Operation Code (OP CODE) portion of the machine language instruction is used for addressing a particular location in storage 20 containing the first micro instruction for interpretation of that machine instruction and addresses of next sequential micro instructions may be contained in the currently extracted micro instructions, so that micro instructions for the interpretation of a machine instruction can be strung together in this manner.

A micro instruction may consist of an operation code specifying the operation to be executed, address fields for two operands OPD 1 and OPD 2 and, consistent with the foregoing example, an address field designating the address of the next micro instruction to be taken from the microprogram storage 20. The operation code may be fed from microprogram 20 through an operation code register (OP-REG) 22 to an operation decoder (OP-DEC) 23 which converts the operation code into uncoded operation control signals, and the control signals may be passed via a number of respective control lines to controlled elements of data flow (usually input and output gate circuits preceding and following particular system components). The controlled elements are controlled, i.e., opened or closed, by means of these operation control signals.

In FIG. 2 the controlled elements of the data flow (DF-CONTR) 24 are shown as a single compact unit. In actual fact, however, they may be scattered throughout various integrated circuit modules in a data processing system.

In particular in a modularly structured digital data processing system, the controlled elements of the data flow 24 may also be modularly structured, as shown, for example, in FIG. 3. According to this figure, a data processing system may consist of plural data flow processing modules (U1 to U4) 32 to 35 receiving control from a common microprogram storage such as 20 (FIG. 2), via an associated operation code register 30, and associated operation decoder unit 31 by means of a widely branched network of control lines emanating from unit 31. In respect to modular data flow controlled units arranged at a greater distance from the operation decoder 31, an unfavorable routing of the lines may lead to design complications which are compounded if such modules are made up of integrated semiconductor modules configured at maximum integration density in which the number of pins for external connection cannot be chosen at random because of design restrictions.

Therefore, an object of the present invention is to provide a solution overcoming disadvantageous design conditions for the routing of lines between the operation decoder of an electronic data processing system and associated controlled elements of the system data flow.

This problem is solved in accordance with the invention by means of the features described and claimed herein.

Other advantages, developments, embodiments and technical aspects of the subject-matter of the invention may be understood from the description and claims.

A particular advantage of the present invention is that it can be used in known electronic data processing systems, in particular those of the low-power class, to overcome line loading limitations imposed by design and technological considerations.

BRIEF DESCRIPTION OF THE DRAWINGS

In the accompanying drawings:

In the embodiment of the invention described below.

FIG. 1 is a block diagram of a known electronic data processing system,

FIGS. 2 and 3 illustrate the control unit and control busing and data busing organization in a system in accordance with FIG. 1, FIGS. 5 to 7 are block diagrams of controlled data flow modules in accordance with the invention.

DETAILED DESCRIPTION

Figure 2:
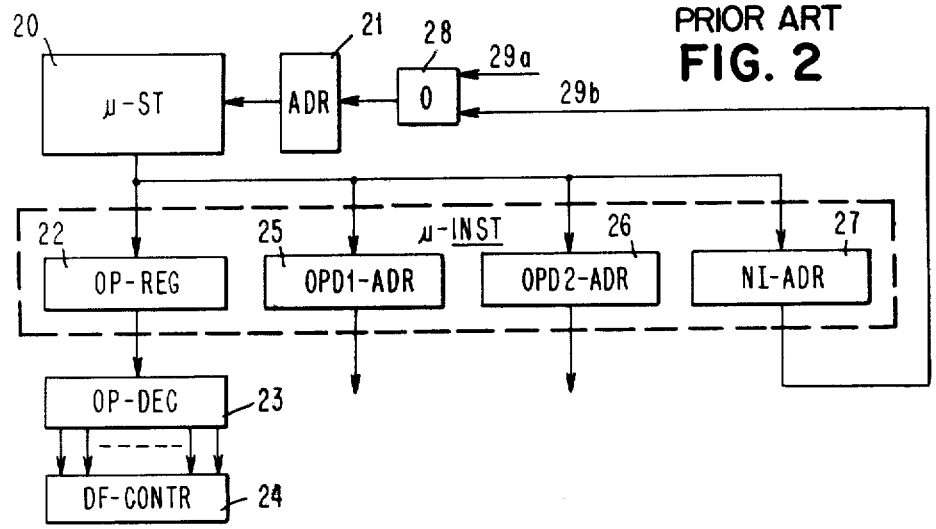

FIG. 2 essentially shows a conventional micro-control unit for implementing the interpretation and execution of machine instructions by means of a sequence of micro instructions. The micro instructions are stored in microprogram storage 20 which is addressed via an address register 21. The address is transferred to the address register 21 via the OR gate 28. The first address of a micro instruction sequence is generally transferred via line 29a from a machine instruction storage not shown. In this particular type of control unit the addresses of the next sequential instructions forming a micro instruction routine are fed via line 29b and OR gate 28 to the address register 21 of the microprogram storage 20. A prerequisite for this is that each micro instruction read from the microprogram storage 20 contains the next sequential address in a special address field which has its fixed location in the micro instruction format. This address field is connected to a "next instruction" address register (NI-ADR) 27 which temporarily holds the address of the next micro instruction.

For the sake of completeness it is pointed out that fields for operand addresses are also connected to corresponding registers (OPD1-ADR) 25 and (OPD2-ADR) 26 for temporary storage of operand addresses. The contents of registers 22, 25, 26, and 27 constitute a complete micro instruction word $\mu$-INST.

The part of this word pertinent to the invention is the operation code part, which, after having been read from the microprogram storage 20, is temporarily stored in operation code register (OP-REG) 22. Thence the operation code is fed to the operation code decoder (OP-DEC) 23. Decoder 23 serves to convert the operation code into control signals which appear on individual output lines of this operation code decoder and are transferred to the control gates in the data flow, which are represented collectively as data flow control (DF-CONTR) 24 in FIG. 2. These gates, for example, may be input/output gates of an arithmetic and logical unit.

Figure 1:
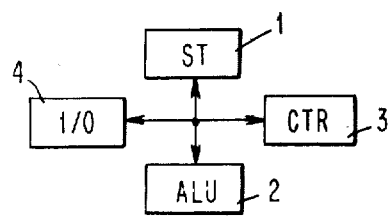
FIGS. 1 to 3 are used to illustrate the disadvantages of known modularly structured digital data processing systems and FIGS. 4 to 7 serve to illustrate the embodiment.
Figure 4:
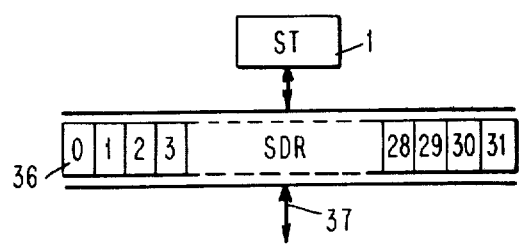
FIG. 4 is a diagrammatic representation of a data operand in a data storage data register, in which not all of the bit positions are required for implementing a particular micro instruction control function.
Figure 3:
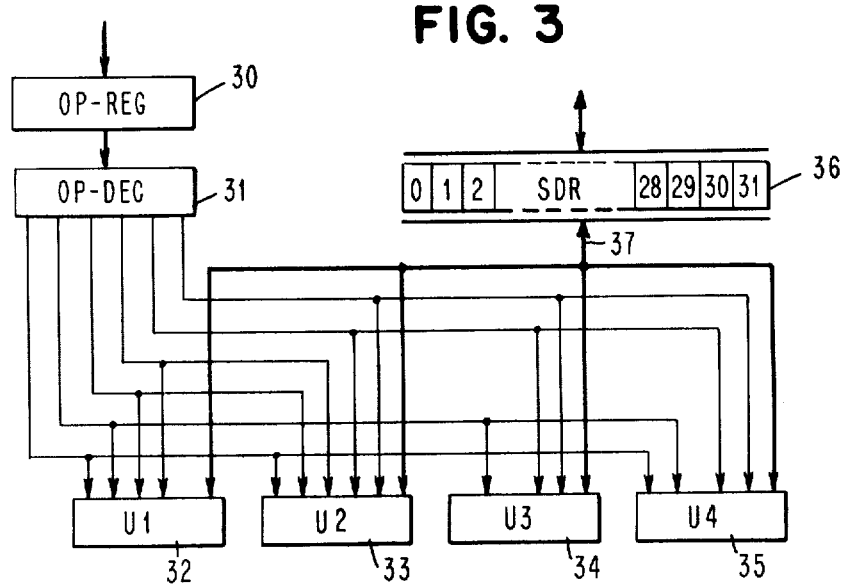

As mentioned in the introduction, a complicated line network results when the decoder output is applied to multiple modules containing the data flow elements of a modularly structured data processing system. This network connects the outputs of the operation decoder to the various control gates of the data flow, as shown in FIG. 3. Modules 32 to 35, depicted in this figure, are components of the data processing system, which also include controlled elements of the data flow 24. As shown in FIG. 3, the result of this is a particular control line system extending from the operation code decoder 31 to the processing modules 32 to 35. The processing modules referred to are also connected to a data bus (DB) 37 which handles the information flow between system storage 1 (FIGS. 1 and 4), via the storage data register (SDR) 36, and the processing modules 32 to 35 in both directions. The width of this data bus 37, which is adapted to the width of the storage data register 36, may be 32 bits, as shown in FIG. 4. Generally, the operands transferred via the data bus 37 have the same width, as is also shown in FIG. 4.

In such data processing systems there is usually a group of micro instructions, for example those concerned with storage protection keys or the translation of virtual storage addresses in systems with a virtual storage concept, for which the operand bit capacity of bus 37 is not utilized in full. In reference to the example shown in FIG. 4, micro instructions of such groups have associated data operands for which bits 28 to 31 are not required for operand representation and are therefore available for other control functions. As data bus 37 leads to all processing modules 32 to 35, the unused bit positions 28 to 31 can be utilized in all of these processing modules for receiving control signal functions.

FIG. 5 shows how control lines from the operation code decoder 31 can be saved with particular processing modules, for example, 32a, if the lines of the data bus 37, which are associated with the bit positions 28 to 31, are used to transfer operation control signals in respect to micro instructions of the group previously mentioned. For this purpose, for example, two output lines 50 of the operation code decoder 31 can be used to address an additional decoder 51 in the various processing modules 32 to 35. In this same example four control bits accommodated in the unused bit positions 28 to 31 of an operand are fed to the additional decoder 51 where they are converted into signals for controlling a respective partial data flow of the processing system in the respective module. The data on bus 37 is temporarily stored in the register 52 in processing module 32a, and the last four bit positions 28 to 31 of register 52 are connected to the respective additional decoder 51. These four control bits are used in the decoder to generate control signals for the corresponding gate circuits in the data flow elements of the processing module 32a.

The output lines of the operation code decoder 31, as shown in FIG. 5, are also branched in multiple to the processing modules 33 to 35, so that the control signals can also reach the latter.

FIG. 6 shows how two control bits on output lines 50 of the operation code decoder 31 can be used to select one of the additional decoders 60, 61 in the various modules 32, 33. The additional decoder 60 in the processing module 32 is addressed when both lines 50 carry a binary one. The additional decoder 61 in module 33, on the other hand, is addressed when the right-hand control line 50 carries a binary zero and the left-hand control line 50 a binary one. The registers 67 and 68 have the same function as the register 52 in FIG. 5 which consists in temporarily storing the data, for example, the operands, transferred via the data bus 37. The respective output signals of the additional decoders 60 and 61 serve to control the respective partial data flows 65 and 66.

The above-mentioned addressing of the different additional decoders 60 and 61 via the control lines 50, the AND gates 62 and 63, and the inverters 64 is a function of the data processing system used and not required in all cases, as is shown, for example, in FIG. 5, according to which the output lines of the operation decoder 31 are led as a multiple line directly to the additional decoders in all processing modules 32 to 35. In respect to the type of micro instructions referred to above the operation control signals on control lines 53 (FIG. 5) together with control signals inserted in otherwise unused bit positions 28 to 31 of the data bus 37 collectively form the inputs to the additional decoders.

The operation control signals for controlling the partial data flow in the individual processing modules 32 to 35 thus consist of a first group of operation control signals supplied by the operation code decoder 31 and a second group of operation control signals fed to the partial data flown controls via bit positions on data bus 37 associated with unused bit positions of data operands associated with particular micro instructions.

The second group of operation control signals can be provided by programming and entered into the desired operand bit positions when the program is initially loaded.

An alternative circuit-controlled solution for deriving the second group of operation control signals in these empty operand bit positions is shown in FIG. 7. A line linking the output of operation code register 30 (see FIG. 3) with operation code decoder 31 is also connected to an address register 71. This register receives the operation code of a micro instruction as an address relative to operation control signal storage (OP-S) 70. From the addressed storage location in storage 70 those four bits are read which are to form the second group of operation control signals to be transferred to the corresponding processing modules in bit positions 28 to 31 of the bus which accommodates data operands. Thus, while the operand-significant part, that means in the present example bits 0 to 27, is fed from the storage of the data processing system to the storage data register 36, the operation control signals forming the second group of operation control signals are transferred via an OR gate 72 to the bit positions 28 to 31 of the storage data register. Thence they are applied to the required processing modules 32 to 35, as previously explained in detail. If, on the other hand, operands being transferred require the full bit width of 0 to 31 for their representation and therefore would be unsuitable for control functions then the bits 28 to 31, as shown in FIG. 7, are fed via the other input of the OR gate 72 from the storage into the storage data register 36 and the output of store 70 is not used.

Depending upon the system and the arrangement of the electronic data processing system used, it may be necessary for the address register 71 to be preceded by a decoder to prevent undesired combinations of operation code from becoming valid addresses of the operation control signal storage 70 and also to ensure a compacter addressing and storage structure for storage 70.

While the invention has been particularly shown and described with reference to a preferred embodiment thereof, it will be understood by those skilled in the art that changes in form and details may be made therein without departing from the spirit and scope of the invention.

Having thus described our invention, what we claim as new, and desire to secure by Letters Patent is:

1. In a modularly structured data processing system controlled by microinstructions, said system including plural data processing modules, a central source of microprogrammed control signals common to said modules, first bus means having plural bit lines for transferring control bit signals in parallel form from said central source to said modules, a central source of data signals common to said modules, second bus means having plural bit lines for transferring data bit signals in parallel form from said central source of data signals to said modules, the improvement for selectively transferring additional control bit signals to said modules through selected bit lines in said second bus means which intermittently are not used for transferring data bits, wherein said central source of control bit signals includes a first control store for storing microinstruction words having operation code syllables, first decoding means coupled to said first control store for producing said control bit signals in response to microinstruction word outputs of said first control store, means coupling outputs of said first decoding means to said first bus means for transferral to said modules, comprising:
 a decoder internal to each said module for decoding control bit signals to generate control signals for internal control of data bit processing operations in the respective module; and
 coupling means internal to each said module for coupling control bit signals to the respective decoder from all of the bit lines in said first bus means, and for coupling additional control bit signals to the respective decoder from said selected lines in said second bus means; each said decoder being responsive to control bit signals coupled thereto by said respective coupling means for operating selectively in first and second modes;
 each said decoder being operative in said first mode to decode said control bit signals and additional control bit signals in combination and in said second mode to decode only said control bit signals for generating control signals for controlling the internal data bit processing operations in the respective module.

2. The improvement of claim 1 in which each said coupling means includes:
 means for recognizing a specific sub-combination of said control bit signals as an address signal uniquely associated with the respective module; and
 means responsive to recognition of said address signal for enabling the decoder in the respective module to operate in said first mode and thereby to decode said control bit signals in combination with said additional control bit signals.

3. The improvement of claim 1 wherein said coupling means in each module includes:
 a multi-bit register for temporarily storing data bit and additional control bit signals received from said second bus means; and
 means for coupling a predetermined part of said register containing said additional control bit signals to the respective decoder.

4. The improvement of claim 1 wherein said source of data bit signals is adapted to supply multi-bit data word signals having a subset of bit positions which at predetermined times are not used for representing data bits; said source further being adapted for issuing representations of said additional control bit signals in said unused bit positions.

5. The improvement of claim 1 wherein:
 a second control store for storing representations of said additional control bit signals, means responsive to predetermined combinations of operation code syllables issued by said first control store for causing said second control store to produce output signals corresponding to associated representations of additional control bit signals stored in said second control store; and wherein
 said central source of data signals includes a third store for storing multi-bit data words, an OR gate coupled to receive inputs from said second control store and from selected output bit stages of said third store and means for coupling outputs from said OR gate and from other output bit stages of said third store to said second bus means for transferral to said modules.

* * * * *